(12) United States Patent
Tapia et al.

(10) Patent No.: US 8,863,240 B2
(45) Date of Patent: Oct. 14, 2014

(54) METHOD AND SYSTEM FOR SMART CARD MIGRATION

(75) Inventors: Pablo Tapia, Snoqualmie, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 384 days.

(21) Appl. No.: 13/021,697

(22) Filed: Feb. 4, 2011

(65) Prior Publication Data

US 2012/0102556 A1 Apr. 26, 2012

Related U.S. Application Data

(60) Provisional application No. 61/405,047, filed on Oct. 20, 2010.

(51) Int. Cl.
| | |
|---|---|
| *H04L 29/06* | (2006.01) |
| *H04W 12/06* | (2009.01) |
| *G06F 21/31* | (2013.01) |
| *H04W 8/26* | (2009.01) |
| *H04W 8/20* | (2009.01) |

(52) U.S. Cl.
CPC ........ *G06F 21/31* (2013.01); *G06F 2221/2117* (2013.01); *H04W 8/26* (2013.01); *H04W 12/06* (2013.01); *H04W 8/205* (2013.01)
USPC ................ 726/4; 726/7; 713/100; 709/217; 709/219; 709/228; 455/411; 455/433; 455/434; 455/435.1; 379/201.12

(58) Field of Classification Search
USPC .......................................................... 726/4
See application file for complete search history.

(56) References Cited

U.S. PATENT DOCUMENTS

| | | | | |
|---|---|---|---|---|
| 5,943,620 | A * | 8/1999 | Boltz et al. ..................... | 455/445 |
| 6,064,887 | A * | 5/2000 | Kallioniemi et al. .......... | 455/445 |
| 6,212,312 | B1 * | 4/2001 | Grann et al. ..................... | 385/24 |
| 7,505,786 | B2 * | 3/2009 | Wennberg et al. ............. | 455/558 |
| 7,548,746 | B2 * | 6/2009 | Kalke ............................. | 455/418 |
| 7,784,106 | B2 * | 8/2010 | Wheeler et al. ................. | 726/34 |
| 7,953,445 | B2 * | 5/2011 | Brown ........................... | 455/558 |
| 8,291,020 | B2 * | 10/2012 | Provo ............................ | 709/206 |
| 8,719,420 | B2 * | 5/2014 | Huber et al. .................. | 709/227 |
| 2002/0091797 | A1 * | 7/2002 | Wallenius et al. ............. | 709/218 |
| 2005/0075137 | A1 * | 4/2005 | Reemtsma ..................... | 455/559 |
| 2006/0276226 | A1 * | 12/2006 | Jiang .............................. | 455/558 |
| 2008/0320573 | A1 * | 12/2008 | Turnbull et al. ................. | 726/6 |
| 2009/0111458 | A1 * | 4/2009 | Fox et al. ..................... | 455/422.1 |
| 2009/0125996 | A1 * | 5/2009 | Guccione et al. ................ | 726/6 |
| 2009/0203371 | A1 * | 8/2009 | Sheng et al. .................. | 455/418 |
| 2009/0239575 | A1 * | 9/2009 | Fu ............................... | 455/552.1 |

OTHER PUBLICATIONS

Vahidian, E., 'Evolution of the SIM to eSIM', Norwegian Univ. of Science & Technology, Jan. 2013, entire document, http://www.diva-portal.org/smash/get/diva2:617036/FULLTEXT01.pdf.*

* cited by examiner

*Primary Examiner* — Taghi Arani
*Assistant Examiner* — Ronald Baum
(74) *Attorney, Agent, or Firm* — Lee & Hayes, PLLC

(57) ABSTRACT

Methods and systems are disclosed for transitioning an existing in-use phone number between an first smart card and a second smart card.

19 Claims, 4 Drawing Sheets

METHOD AND SYSTEM FOR SMART CARD MIGRATION

PRIORITY CLAIM

This application claims priority to provisional patent application Ser. No. 61/405,047, filed Oct. 20, 2010.

SUMMARY WITH BACKGROUND INFORMATION

Cellular-enabled devices and satellite televisions are just two consumer electronic devices that now widely use smart card technology. Herein, "smart card" shall be understood to refer to integrated circuit cards comprising volatile and/or non-volatile computer memory storage components, security logic, and/or computer microprocessor components, with dimensions similar to or smaller than credit cards, e.g. 3.370" by 2.125", by 0.030" thick or smaller. The smart card is used by inserting it into a computing device, such as a cellular phone, smart phone, cellular enabled tablet computer, or e-reading device, which device makes contact with the smart card and activates and/or access the memory and/or processing components. Some cellular-enabled devices, such as cellular phones using Global System for Mobile Communications or GSM technology, require insertion of a special type of smart card, called a Subscriber Identity Module or SIM card, into the phones. Other types of cellular-enabled devices require or allow use of a Removable User Identity Module (in CDMA) or Universal Integrated Circuit Card (in Universal Mobile Telecommunications Systems). All such cards and modules are collectively referred to herein as "SIM cards" or "smart cards." Smart cards carry a subscriber identifier called, in GSM embodiments, an International Mobile Subscriber Identifier or another number or identifier which is used to identify the telecommunication device user and/or the user's smart card to a core network and to authorize the subscriber's use of the telecommunication device on the network (collectively referred to herein as an "IMSI"). Smart cards may be provided in telecommunications devices and/or to a user with pre-installed data, logic, and/or instructions, such as an IMSI, an Mobile Subscriber Integrated Services Digital Network Number ("MSISDN"), programs, or similar. A smart card may be provided with an IMSI which is associated with an MSISDN in the provider's network, such that the MSISDN need not be stored in the smart card.

As with electronic devices generally, however, smart card technology is rapidly evolving. With or without a change in form factor, the on-board technology is becoming more robust, providing more capabilities to telecommunication device users, such as different or improved security hardware, logic, data, processing bitrate, response time, memory, or other features. Unfortunately, many telecommunication device users do not take advantage of such enhanced features because they are reluctant to replace their original smart card. For example, a telecommunication device user may incorrectly assume that his or her phone number is tied to his or her existing smart card and, as a result, be reluctant to adopt a new smart card for fear of losing his or her existing phone number.

When a user of existing smart card technologies changes cellular-enabled devices or changes a smart card within one device, the user may have to contact a customer service representative, who may have to make changes to backend database entries, such as in a Home Location Register ("HLR") or Home Subscriber Server ("HSS"), to associate the new device and/or smart card with the user's existing MSISDN and with other services provided by the wireless carrier. Interaction with a customer service representative creates costs for the wireless carrier and decreases the likelihood that the user will attempt the change.

In addition, because older smart cards do not possess the more robust capabilities of new smart cards, operation of associated electronics devices and associated networks is not optimal. For example, as telecommunications networks evolve from older GSM technologies to, for example, Long Term Evolution or LTE technologies, the performance of newer networks may be hindered by the continuing use of older smart cards in cellular-enabled devices.

A method, system, and/or apparatus is required which allows a user to change from a first smart card to a second smart card, within a first telecommunications device or between a first telecommunications device and a second telecommunication device, without user interaction with a customer service representative. Such method, system, and/or apparatus should involve as few steps as possible and should transfer information from or associated with the first smart card and/or device to the second smart card and/or device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Figure 1:
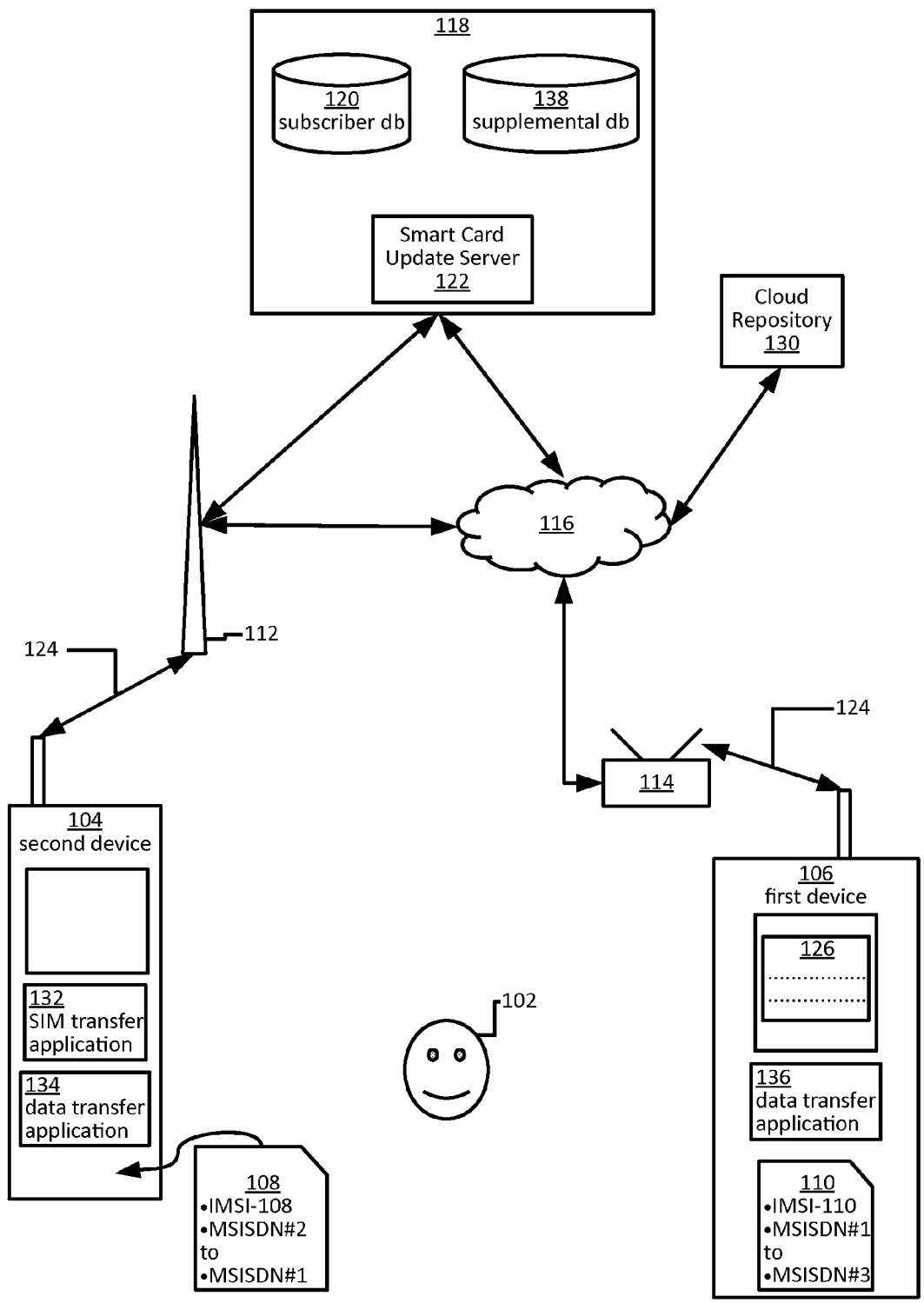
FIG. 1 is a diagram showing the transitioning of user information from a first smart card of a first telecommunication device to a second smart card of a second telecommunication device, in accordance with various embodiments

FIG. 1 is a diagram showing a telecommunication device user 102 who is transitioning from a first telecommunication device 106 that uses an first smart card 110, to a second telecommunication device 104 that can use a second smart card 108. Discussion of FIG. 1 also refers to the message diagram in FIG. 3. Common numbers in FIG. 1 and FIG. 3 shall refer to common devices or structures. Both first telecommunication device 106 and second telecommunication device 104 can access wireless telecommunications services provided by a core network 118 by accessing one or more cell tower(s) 112. Such cell towers are any type of cell towers, such as a base transceiver station or BTS, a nodeB, an e-nodeB, etc. Although only one cell tower 112 is depicted in FIG. 1, one of skill in the art will recognize that telecommunication device 104 and telecommunication device 106 may individually be served by more than one cell tower or, together, by different and/or more than one cell tower, such as when a telecommunication device (either 104 or 106) communicates with more than one cell tower or if first telecommunication device 106 and second telecommunication device 104 are of different generations (e.g., 3G vs. 4G) and communicate with different types of cell towers or different equipment within one cell tower. Telecommunication devices 104 and 106 may also access wireless telecommunications services, including IP-based services, by accessing other types of access points, such as access point 114, via a WiFi transceiver. One of skill in the art will understand that telecommunication devices 104 and 106 may access telecommunications services in a variety of other ways. Telecommunication devices 104 and 106 communicate with a core network 118 via a variety of nodes (not shown). In the case of IP-based communications, telecommunication devices 104 and 106 may communicate with core network 118 via an IP-based network such as the Internet 116. Core network 118 is composed of a variety of nodes, include a subscriber database 120, which may be, for example, a Home Location Register ("HLR") in GSM embodiments or a Home Subscriber Server ("HSS") in LTE embodiments. One of skill in the art will recognize that other similar databases may be used in the future. The subscriber database 120 contains information associated with subscribers, including user 102, such as records comprising subscriber identifiers such as IMSIs, MSISDNs, service parameters, whether a subscriber is registered on the network, what switch, access point, cell tower, Visitor Location Register ("VLR"), or other node is serving or has served the subscriber, how the subscriber has been served by the various nodes, location associated information, and network-access information. Subscriber database 120 may contain associations between records containing the information, such as, for example, associations between MSISDNs and IMSIs. Also shown is supplemental database 138 which may be part of, separate from, and/or may communicate with the subscriber database 120 and/or part of or separate from the smart card update server 122. The supplemental database 138 may contain records such as whether a subscriber has requested or initiated a transfer from a first smart card to a second smart card, a security code (discussed later), and information associated with such information, including information from subscriber database 120, etc. The subscriber database 120 and supplemental database 138 may comprise ordered or unordered flat files, ISAM, heaps, hash buckets, logically-blocked files, and/or B+trees, or similar. Network 118 may also include a smart card update server 122 as described herein.

Both first smart card 110 and second smart card 108 are smart cards which carry a subscriber identifier, such as an IMSI, such as IMSI-108 and IMSI-110. Smart card 110 may be associated in the network 118 with and/or may carry MSISDN#1. Smart card 108 may be associated in the network 118 with and/or may carry MSISDN#2. In some embodiments, first smart card 110 may be an older smart card that has been provisioned to receive service from network 118 utilizing MSISDN#1. As part of provisioning, subscriber database 120 contains records including the subscriber identifier carried on first smart card 110, such as IMSI-110, and identifying user 102 as an authorized subscriber on network 118. When first telecommunication device 106 attempts to register to network 118, first telecommunication device 106 transmits the subscriber identifier (or a result of a process performed on the subscriber identifier) carried by first smart card 110 to network 118, where it is validated against the subscriber identifier and other records residing in subscriber database 120, thereby allowing first telecommunication device 106 to receive service from network 118. As an example in GSM networks, this is referred to as an "IMSI attach" procedure. Other similar procedures may be used in other networks, all of which shall be referred to herein as "registration" with a network. One of skill in the art will understand that a subscriber identifier may be associated with one or more MSISDNs in the network 118 or 218, such as in a subscriber database. As used herein, references to an "active MSISDN" shall refer to an MSISDN which is authorized to obtain services from network 118 or 218 (beyond a limited set of services which network 118 or 218 may provide to any user and/or MSISDN, such as to place 911 call and/or calls to customer service), such as through the payment of consideration for a subscription, payment of consideration for metered use of the network 118 or 218, or similar. Thus, the subscriber identifier carried on first smart card 110 may be important for telecommunication device 106 to receive services from network 118.

Second smart card 108 may be provided to user 102 in any manner, but will typically be provided in packaging containing second telecommunication device 104. If user 102 wishes to upgrade to second telecommunication device 104, such device may be accompanied by second smart card 108. In some embodiments, the second smart card 108 may be a newer smart card and may be a later-generation smart card than first smart card 110, and therefore is likely more robust than first smart card 110. Thus, user 102 may wish to use second smart card 108 in order to take advantage of its more robust features and capabilities, and may do so as described herein.

In order to transition to using second smart card 108, user 102 will first insert second smart card 108 into his or her second telecommunication device 104 (if the device 104 is not provided with the second smart card 108 installed) and then power on the device. Second telecommunication device 104 holds, in memory (including, potentially, on the second smart card 108), an application that facilitates the first power on of second telecommunication device 104, hereinafter referred to as the "smart card transfer application 132." As a non-limiting example, the application may be written using the SIM application toolkit and/or the application may be embedded in the operating system of the device. For example, the smart card transfer application 132 will recognize that second telecommunication device 104 is being powered on for the first time, or powered on for the first time after second telecommunication device 104 has been manually reset, or otherwise. The smart card transfer application 132 will present a user interface to user 102, which interface may query user 102 regarding a number of his or her preferences. Among these queries is a query whether telecommunication device user 102 wishes to transition from a first smart card (such as first smart card 110) to a second smart card (such as second smart card 108). The smart card transfer application 132 may present additional information explaining the benefits of transitioning to a second smart card, such as service optimization and other benefits, while still using his or her first phone number or MSISDN. If user 102 indicates that he or she does wish to transition to using second smart card 108, then application will request user 102 to input his or her MSISDN. In the example presented herein, the MSISDN of the user is active MSISDN#1, which, at the time of the transfer request, is associated in the network 118 and the subscriber database 120 with the subscriber identifier carried on the first smart card 110, such as IMSI-110. User 102 may be unaware that smart card 108 is associated in the network 118 with or carries non-active MSISDN#2, which MSISDN#2 may be a provisional MSISDN provided or associated with any smart card (provided, for example, to allow a device holding the smart card to make 911 calls, customer service calls, or similar before the device/smart card has been authorized to make wider use network 118). If user 102 enters an MSISDN, then a message will be dispatched, such as at steps 301.1 and 301.2 in FIG. 3, and the user interface presented on second telecommunication device 104 by the smart card transfer application will request that user 102 input a smart card update security code as discussed herein.

Once second telecommunication device 104 and the smart card transfer application 132 has received MSISDN#1 via user input, the smart card transfer application 132 sends a message to network 118, which is received by smart card update server 122. The message contains the MSISDN input by user 102, MSISDN#1. The message either includes or is assumed to be a request to associate MSISDN#1, with the second smart card 108, including IMSI-108, and/or the second telecommunication device 104 and removing (or otherwise updating) such associations with respect to the first smart card 110. As noted above, see for example steps 301.1 and 301.2 in FIG. 3

Smart card update server 122 manages the update of subscriber identifiers. Upon receiving the message from second telecommunication device 104, smart card update server 122 polls subscriber database 120 to determine whether a telecommunications device is currently registered on the network and associated, such as via an IMSI, with the provided MSISDN. See, for example, step 301.3 in FIG. 3, which depicts the smart card update server 122 requesting the subscriber profile associated with MSISDN#1. The smart card update server 122 may also receive or be provided with a subscriber profile or information relating to MSISDN#2, such as at step 301.4 in FIG. 3. If a telecommunications device is registered and associated with the provided MSISDN, such as first telecommunication device 106, smart card update server 122 transmits a request for user confirmation message to, for example, the first telecommunication device 106 conveying that the second telecommunication device 104 with a second smart card 108 has requested permission to update subscriber database 120 such that MSISDN#1 will be associated with the second smart card 108, a second subscriber identifier on or associated with the second smart card 108, such as IMSI-108, and/or the second telecommunication device 104.

Figure 3:
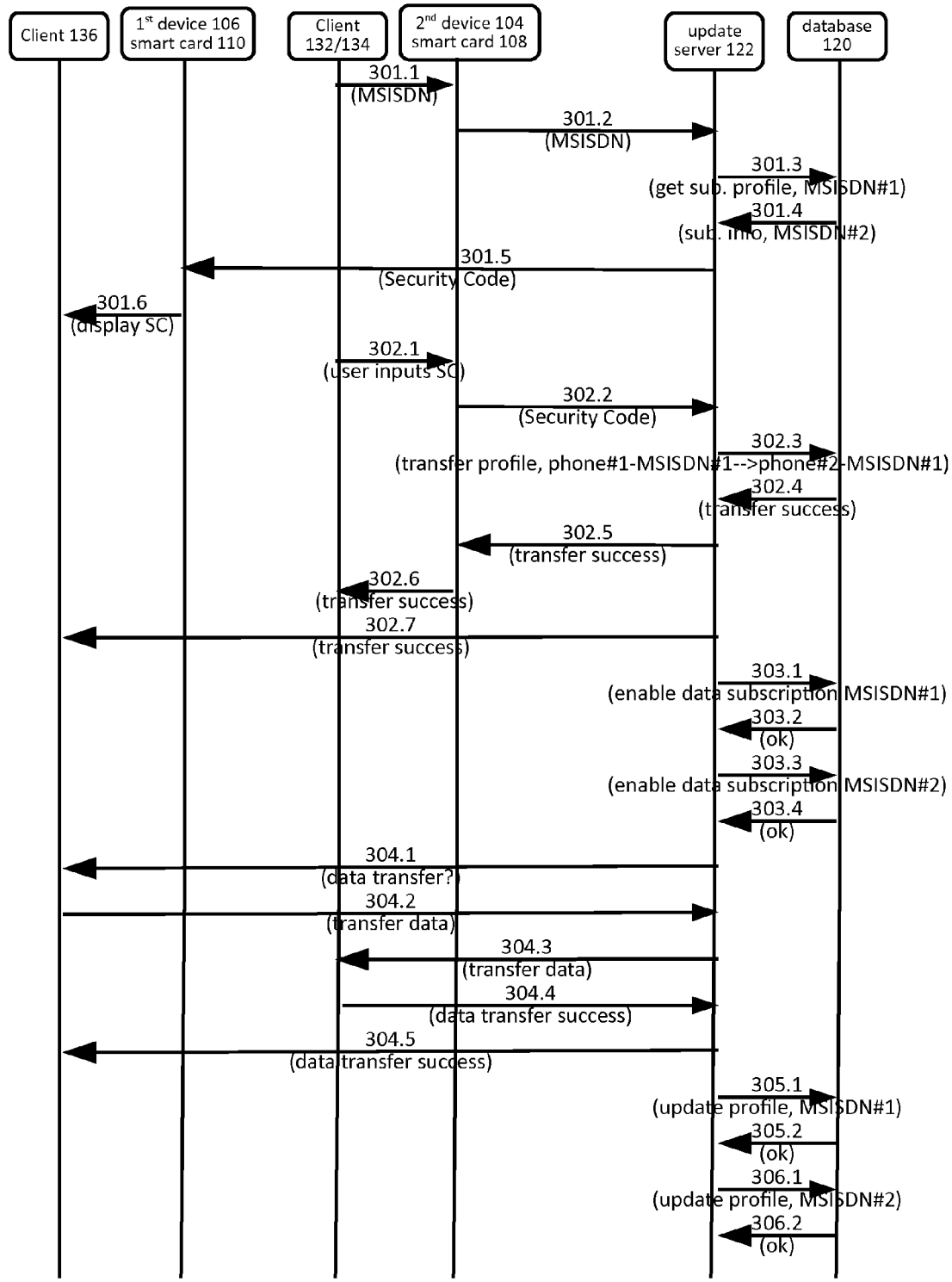
FIG. 3 is a diagram of messages between one or more users, devices controlled by the user, an update server, and a database, in accordance with various embodiments.

Smart card update server 122 will also generate a security code, store the security code in, for example, the supplemental database 138 (associated, for example, with an IMSI obtained from the second telecommunication device 104, and/or the MSISDN#1 input by the user and communicated to the network 118, per above), and include in a message sent to the first telecommunication device 106, such as the request for user confirmation message, the smart card update security code. The security code may comprise a randomly generated number or string; the security code may encode information; the security code may be encrypted. The messages between the telecommunication devices and the smart card update server 122 may be in any messaging format, including an SMS message. FIG. 3 depicts transmission of the security code at step 301.5.

Upon receipt of the request for user confirmation message from smart card update server 122, first telecommunication device 106 may automatically present the request for user confirmation message and the smart card update security code to user 102 via, for example, a textual message 126. In other embodiments, user 102 may navigate to the received request for user confirmation message and smart card update security code, which may then be presented as a textual message 126. The received request for user confirmation message and smart card update security code may be presented, for example, in an SMS in-box. Such a textual message 126 may additionally contain information directing user 102 to enter the smart card update security code into second telecommunication device 104. Display of the security code is depicted in FIG. 3 at step 301.6.

In some embodiments, first telecommunication device 106 may hold, in memory, a data transfer application, such as data transfer application 136, which manages the transition of smart cards. The data transfer application may be the same as or different from the smart card transfer application. In such embodiment, the data transfer application may identify that a message from smart card update server 122, such as the request for user confirmation message or another message, initiates the transfer of data or information residing on first smart card 110 and/or first telecommunications device 106 to second smart card 108 and/or second telecommunications device 104. In such embodiments, the data transfer application 136 may initiate packaging of such data and information (such as address book contact information, digital photos, emails, etc.—as a non-limiting example, address book contact information may be formated according to the LDAP Data Interchange Format, a tab delimited file, a comma-separated file, and/or a vCard) for transmission to second telecommunication device 104. Packaging of such data and information may include accessing the data and serializing the data into one or more files. More than one data package may be compiled for different of the underlying applications from which data is obtained. Such information may not be transmitted, however, until a server confirmation message is received from smart card update server 122 as contemplated herein.

As disclosed above, the smart card transfer application 132 executed by the second telecommunication device 104 presents a user interface requesting user 102 to input a smart card update security code. User 102 inputs, into second telecommunication device 104, the smart card update security code that is presented on first telecommunication device 106, such as via the textual message 126. See, for example, step 302.1 in FIG. 3. User 102 then selects to transmit the smart card update security code. Upon such selection, second telecommunication device 104 dispatches a message containing, at minimum, the smart card update security code, to smart card update server 122. See, for example, step 302.2 in FIG. 3.

Smart card update server 122 receives the message containing the smart card update security code, optionally determines that the message contains a smart card update security code (such as according to the format of the message and/or the message content), determines that the device sending the smart card update security code is the second telecommunications device 104 (which originally sent the message containing MSISDN#1), and determines that the smart card update security code is the smart card update security code sent to the first telecommunications device 106. These steps may be performed by checking records in the subscriber database 120 and/or supplemental database 138.

Having validated the received smart card update security code, smart card update server 122 then dispatches a message to subscriber database 120 updating the subscriber records associated with user 102, namely, to replace the subscriber identifier associated with first smart card 110, IMSI-110, with the subscriber identifier associated with second smart card 108, IMSI-108. See, for example, step 302.3 in FIG. 3.

Subscriber database 120 may dispatch a confirmation to smart card update server 122, such as at step 302.4 of FIG. 3, which may then dispatch messages to either or both of telecommunication devices 104 and 106 conveying, for example, that MSISDN#1 has been disassociated with first smart card 110 and user 102 and that second smart card 108 has been provisioned on network 118 and is now associated with MSISDN#1 and user 102. See, for example, steps 302.5, 302.6, and 302.7 in FIG. 3. If not already enabled for data transmission, user profiles and/or subscriber information associated with MSISDN#1 and MSISDN#2 may be enabled for data transmission, such as at steps 303.1 through 303.4 in FIG. 3.

As disclosed above, a data transfer application 136 may be resident on first telecommunication device 106 which manages the migration from first smart card 110 to second smart card 108, including the transfer of data and other information residing on first smart card 110 and/or first telecommunication device 106 to second smart card 108 and/or second telecommunication device 104. In an embodiment, the data transfer application 136 may have already packaged such data and information for transmission to second telecommunication device 104 for updating the second smart card 108 and/or second telecommunication device 104. In an embodiment, the data transfer application 136 may identify the received server confirmation message from smart card update server 122 as a trigger to package (if not already done so) and transfer such data and information to second telecommunication device 104 or to an network-based data repository, such as smart card update server 122 and/or the cloud repository 130, for updating the second smart card 108 and/or second telecommunication device 104. Such embodiment would be represented in FIG. 3 as combining steps 302.7 and 304.1. Separate server messages are otherwise represented in FIG. 3 by steps 302.7 and 304.1. In either embodiment, first telecommunication device 106 dispatches a message or otherwise transmits the data and information to second telecommunication device 104 and/or to the smart card update server 122 and/or to a cloud data repository 130 for updating the second smart card 108 and/or second telecommunication device 104. Such message can be transmitted through any known bearer, such as e-mail, as attachment to an e-mail, etc. See, for example, step 304.2 in FIG. 3. When received by second telecommunication device 104, an application residing on second telecommunication device 104, such as the smart card transfer application 132 or data transfer application 134, recognizes the received data and information as requiring update to second smart card 108 and/or other memory in the second telecommunication device 104 and completes such update. See, for example, steps 304.3, 304.4, and 304.5 in FIG. 3.

Because the packaged data and information needs to be sent from the first telecommunication device 106 at a time when the first telecommunication device 106 has permission in network 118 to send the packaged data and information, the packaged data and information will typically be sent before MSISDN#1 has been disassociated with smart card 110 and IMSI-110. The packaged data and information will then typically be sent to the second telecommunications device 104 which contains smart card 108 and IMSI-108, which would then typically be associated with MSISDN#2. In this example, the packaged data and information will then be routed to the second telecommunication device 104 at or via MSISDN#2. See, for example, steps 305.1 through 306.2 in FIG. 3. A practitioner skilled in the art will understand that references to "routing" herein refers to transmitting data messages in a network to a network address; references to routing may recite that a message is being sent "to" a particular computer at or associated with a network address. It would be understood that a computer sending the message may or may not explicitly send the message to the particular computer, but rather that the message may be routed to a network address at which the particular computer may be found; the network address system may map devices to addresses or the network address system may route messages without reference to a device. A network-based data repository may be used to facilitate this transfer, such as the smart card update server 122, the cloud repository 130, and/or a database accessible to the smart card update server 122, which network-based data repository may be used to hold the packaged data and information and which network-based data repository may be signaled by the smart card update server 122 when the packaged data and information is to be transmitted to the second telecommunication device 104. The network-based repository may hold the packaged data and information to a time when the second device 104 and the smart card 108 and IMSI-108 are still associated with MSISDN#2, allowing the packaged data and information to be routed with or via MSISDN#2 to the second telecommunication device 104. As an alternative, the network-based repository may hold the packaged data and information until the second device 104 and the smart card 108 and IMSI-108 have been associated with MSISDN#1, allowing the packaged data and information to be routed with or via MSISDN#1 to the second telecommunication device 104.

MSISDN#2, if any, may be disassociated with second smart card 108, with or without informing, for example, user 102. See, for example, step 306.1 and 306.2 in FIG. 3. In an embodiment, a new MSISDN#3 may be created by the smart card update server 122 and/or the subscriber database 120, the new MSISDN#3 being transmitted to the first telecommunication device 106 and/or being associated with the first smart card 110 in, for example, the subscriber database 120. As with MSISDN#2, MSISDN#3 may not be an active MSISDN but may be associated with records which allow, for example, the first device 106 to make 911 calls or for other (typically) limited purposes.

Figure 2:
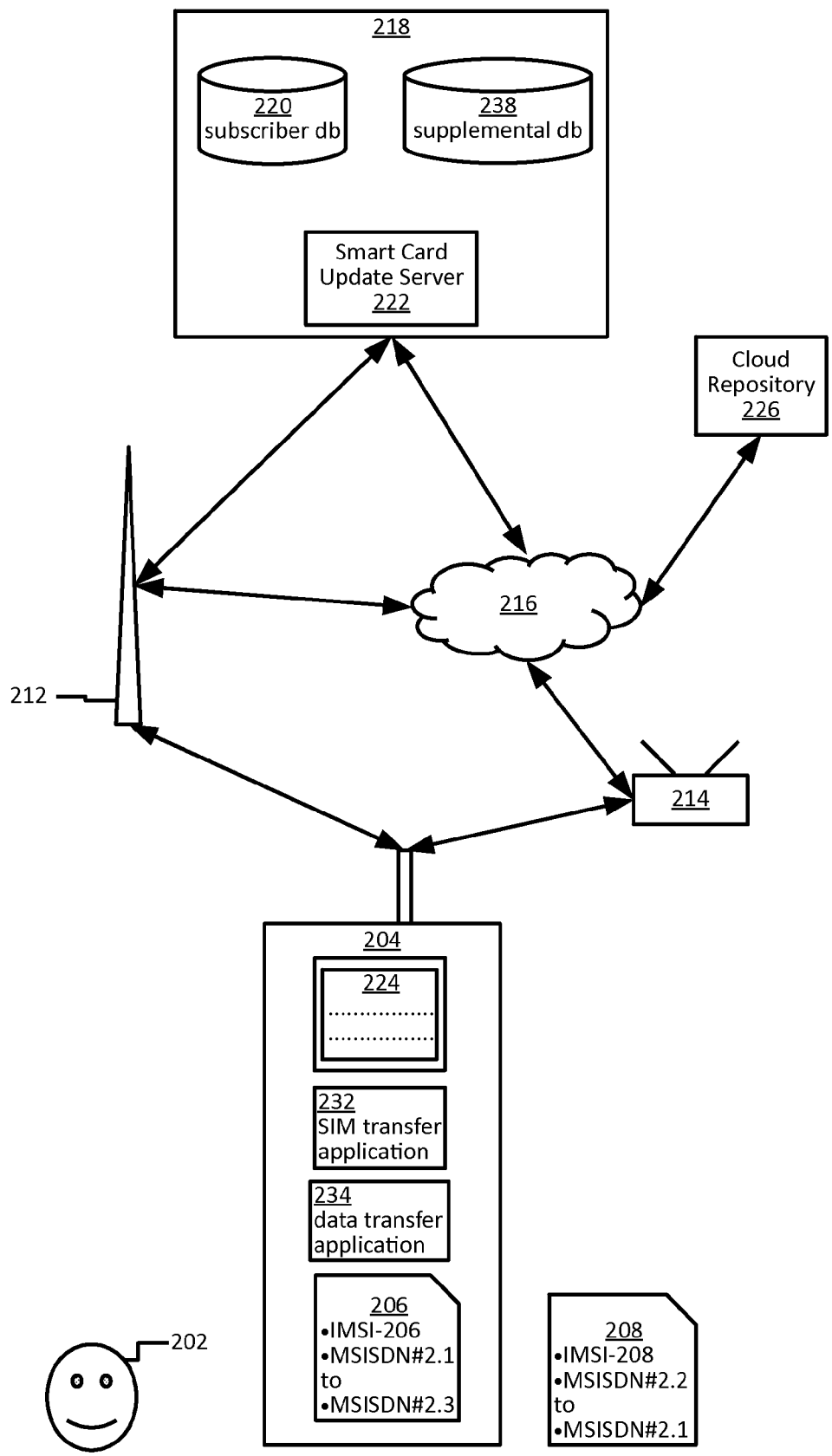
FIG. 2 is a diagram showing the transitioning of user information from a first smart card of a telecommunication device to a second smart card of that telecommunication device, in accordance with various embodiments.

FIG. 2 is diagram showing a telecommunication device user 202 who is transitioning from a first smart card 206 to a second smart card 208 within telecommunication device 204. Telecommunication device 204 may be referred to herein a "common substrate computing device." Telecommunication device 204 can access wireless telecommunications services provided by a core network 218 by accessing one or more cell tower(s) 212. Such cell towers are any type of cell towers, such as a base transceiver station or BTS, a nodeB, an e-nodeB, etc. Although only one cell tower 212 is depicted in FIG. 1, one of skill in the art will recognize that telecommunication device 204 may be served by more than one and/or different cell towers, such as if telecommunication device 204 communicates with more than one cell tower and/or utilizes different generations of wireless telecommunications technologies (e.g., 2G vs. 3G). Telecommunication device 204 may also access wireless telecommunications services, including IP-based services, by accessing other types of access points, such as access point 214, via a WiFi transceiver. One of skill in the art will understand that telecommunication device 204 may access telecommunications services in a variety of other ways. Telecommunication device 204 communicates with a core network 218 via a variety of nodes (not shown). In the case of IP-based communications, telecommunication device 204 may communicate with core network 218 via an IP-based network such as the Internet 216. Network 218 is composed of a variety of nodes, including a subscriber database 220, which may be, for example, a Home Location Register ("HLR") in GSM embodiments or a Home Subscriber Server ("HSS") in LTE embodiments. One of skill in the art will recognize that other similar databases may be used in the future. The subscriber database 220 contains information associated with subscribers, including user 202, such as records comprising subscriber identifiers such as IMSIs, MSISDNs, service parameters, whether a subscriber is registered on the network, what switch, access point, cell tower, VLR, or other node is serving or has served the subscriber and how, location associated information, and network-access information. Subscriber database 220 may contain associations between records containing the information, such as, for example, between MSISDNs and IMSIs. Also shown is supplemental database 238 which may be part of, separate from, and/or may communicate with the subscriber database 220 and/or part of or separate from the smart card update server 222. The supplemental database 238 may contain records such as whether a subscriber has requested or initiated a transfer from a first smart card to a second smart card, a security code, and information associated with such information, including information from subscriber database 220, etc. The subscriber database 220 and supplemental database 238 may comprise ordered or unordered flat files, ISAM, heaps, hash buckets, logically-blocked files, and/or B+ trees, or similar. Network 218 may also include a smart card update server 222, as described herein.

Both first smart card 206 and second smart card 208 are smart cards which carry a subscriber identifier, such as an IMSI, such as IMSI-206 and IMSI-208. Smart card 206 may be associated in the network 118 with and/or may carry MSISDN#2.1; smart card 208 also may be associated in the network 118 with and/or may carry MSISDN#2.2. In some embodiments, first smart card 206 may be an older smart card that has been provisioned to receive service from network 218. As part of provisioning, subscriber database 220 contains records including the subscriber identifier carried on first smart card 206, such as IMSI-206, and identifying user 202 as an authorized subscriber on network 218. When telecommunication device 204 attempts to register to network 218, telecommunication device 204 transmits the subscriber identifier (or a result of a process performed on the subscriber identifier) carried by first smart card 206 to network 218, where it is validated against the subscriber identifier and other records residing in subscriber database 220, thereby allowing telecommunication device 204 to receive service from network 218. As an example in GSM networks, this is referred to as an "IMSI attach" procedure. Other similar procedures may be used in other networks, all of which shall be referred to herein as "registration" with a network. Thus, the subscriber identifier carried on first smart card 206 is essential for telecommunication device 204 to receive services from network 218.

Second smart card 208 may be provided to user 202 in any manner. In some embodiments, second smart card 208 may be a newer smart card and may be a later-generation smart card than first smart card 206, and therefore is likely more robust than first smart card 206. Thus, user 202 may wish to use second smart card 208 in order to take advantage of its more robust features and capabilities, and may do so as described herein.

In order to transition to using second smart card 208, user 202 will first insert second smart card 208 into telecommunication device 204, and then power on the device. Telecommunication device 204 holds, in memory (including, potentially, on the second smart card 208), an application that facilitates the power on of telecommunication device 204, hereinafter referred to as the "smart card transfer application 232." As a non-limiting example, the application may be written using the SIM application toolkit and/or the application may be embedded in the operating system of the device. For example, the smart card transfer application 232 may recognize that telecommunication device 204 is being powered on with a second smart card. The smart card transfer application 232 will present a user interface to user 202, which interface may query user 202 whether telecommunication device user 202 wishes to transition from an first smart card (such as first smart card 206) to a second smart card (such as second smart card 208). The smart card transfer application 232 may present additional information explaining the benefits of transitioning to a second smart card, such as service optimization and other benefits, while still using his or her old phone number or MSISDN, which MSISDN is then, at the time of the request, associated with the first smart card 206 and/or the subscriber identifier carried in the first smart card 206. If user 202 indicates that he or she does wish to transition to using second smart card 208, then the smart card transfer application 232 will request user 202 to input his or her phone number or MSISDN. In the example presented herein, the MSISDN of the user is MSISDN#2.1, which, at the time of the transfer request, is associated in the network 218 and the subscriber database 220 with the subscriber identifier carried on the first smart card 206, such as IMSI-206. User 202 may be unaware that the second smart card 208 is associated in the network 118 with and/or carries MSISDN#2.2, which MSISDN#2.2 may be a provisional MSISDN provided or associated with any smart card (provided, for example, to allow a device holding the smart card to make 911 calls or similar before the device/smart card has been authorized to use the network 118). If user 202 enters an MSISDN, then a message will be dispatched as discussed herein, and the user interface presented on telecommunication device 204 by the smart card transfer application 232 will request that user 202 power off telecommunication device 204, replace second smart card 208 with first smart card 206, and then power on telecommunication device 204. Such user interface may be presented in textual message 224.

Prior to powering down, telecommunication device 204 sends a message to network 218, which is received by smart card update server 222. smart card update server 222 manages the update of subscriber identifiers. The message may contain the MSISDN input by user 202, such as MSISDN#2.1. The message either includes or is treated as a request to associate the input MSISDN with the second smart card 208. In many systems, processing such a message at the smart card update server 122 may involve associating the MSISDN with a subscriber identifier associated with the second smart card 208, such as IMSI-208 and removing (or otherwise updating) such associations with respect to the first smart card 206. Upon receiving the message from telecommunication device 204, smart card update server 222 periodically polls subscriber database 220 to determine when a telecommunications device, such as telecommunication device 204, has registered on the network utilizing a smart card, such as first smart card 206, which is associated, such as through IMSI-206, with the input MSISDN, MSISDN#2.1. Such periodic polling may occur at any time interval over a period of several minutes, thus providing user 202 with opportunity to manually power off telecommunication device 204, replace second smart card 208 with first smart card 206, power on telecommunication device 204, and to allow telecommunication device 204 to register to network 218. Telecommunication device 204 is powered on and registered to network 218 utilizing the first smart card 206 and IMSI-206, associated with MSISDN#2.1. Once it identifies that telecommunication device 204 is registered on network 218, smart card update server 222 transmits a request for user confirmation message to telecommunication device 204 requesting permission to update subscriber database 220 such that MSISDN#2.1 will be associated with a second subscriber identifier resident on second smart card 208, such as IMSI-208. Smart card update server 222 may also include a smart card update security code in the request for user confirmation message or a subsequent message. The security code may be generated by the smart card update server 222, which may store the security code in, for example, the supplemental database 238 (associated, for example, with the IMSI-208 and/or the MSISDN#2.1 input by the user and communicated to the network 218, per above). The request for user confirmation message or subsequent message may be in any messaging format, including an SMS message.

Upon receipt of the request for user confirmation message from smart card update server 222, telecommunication device 204 may automatically present the message and the smart card update security code to user 202 via, for example, a textual message 208. In other embodiments, user 202 may navigate to the received request for user confirmation message and smart card update security code, which may then be presented as a textual message 224. The received request for user confirmation message and smart card update security code may be presented, for example, in an SMS in-box. The request for user confirmation message may additionally contain information directing user 202 to write down the security code, power down telecommunication device 204, replace first smart card 206 with second smart card 208, and enter the smart card update security code into telecommunication device 204.

In some embodiments, telecommunication device 204 may hold, in memory, a data transfer application 234 that manages the transition of smart cards. The data transfer application 234 may be the same as or different from the smart card transfer application 232. In such embodiment, the data transfer application 234 may identify that the received request for user confirmation message from smart card update server 222 or an affirmative message sent in response to the request for user confirmation message is a signal to initiate the transfer of any other data or information residing on first smart card 206 to second smart card 208. In such embodiment, the data transfer application 234 may initiate packaging of such data and information (such as address book contact information or other information as discussed above) for transmission to a network-based data repository, such as cloud data repository 226, or to a location in memory residing in telecommunication device 204, other than in a smart card. Packaging of such data and information may include accessing the data and serializing the data into one or more files. Following packaging of such data and information, the data transfer application may transmit the packaged data and information to a network-based data repository, such as cloud repository 226, or to memory in or otherwise accessible to telecommunications device 204. In a network-based data repository embodiment, the data and information will not be transmitted until a confirmation message is received from smart card update server 222, as contemplated herein. A network-based data repository, such as cloud repository 226 or cloud repository 130, may comprise a server and memory accessible through available networks, such as Internet 216 or 116.

After powering off telecommunication device 204, replacing first smart card 206 with second smart card 208, and powering on telecommunication device 204, the smart card transfer application 232 executed by the telecommunication device 204 presents a user interface requesting user 202 to input a smart card update security code. User 202 then inputs, into telecommunication device 204, the smart card update security code that was or is presented on telecommunication device 204, such as via the textual message 224. User 202 then selects to transmit the smart card update security code. Upon such selection, telecommunication device 204 dispatches a message containing, at minimum, the smart card update security code, to smart card update server 222.

Smart card update server 222 receives the message containing smart card update security code, optionally determines that the message contains a smart card update security code (such as according to the format of the message and/or the message content), determines that the device sending the smart card update security code is the telecommunications device 204 (which originally sent the message containing MSISDN#2.1), determines that the smart card in the telecommunications device 204 (at the time the message containing the smart card update security code was sent by the telecommunications device 204) is the second smart card 208 with IMSI-208, and optionally determines that the smart card update security code is the smart card update security code sent to the telecommunications device 204 when the telecommunications device 204 contained the first smart card 206 with IMSI-206. These steps may be performed by checking records in the subscriber database 220 and/or supplemental database 238.

Having validated the received smart card update security code, smart card update server 222 then dispatches a message to subscriber database 220 updating the subscriber records associated with user 202, namely, to replace the subscriber identifier associated with first smart card 206, IMSI-206, with the subscriber identifier associated with second smart card 208, IMSI-208.

Subscriber database 220 may dispatch a confirmation to smart card update server 222, which may then dispatch server confirmation messages to telecommunication device 204 conveying, for example, that first smart card 206 and IMSI-206 has been disassociated with user 202, and that second smart card 208 and IMSI-208 has been provisioned on network 218 and is now associated with user 202. MSISDN#2.2, if any, may be disassociated with second smart card 208, with or without informing, for example, user 202. In an embodiment, a new MSISDN#2.3 may be created by the smart card update server 222 and/or the subscriber database 220, the new MSISDN#2.3 being transmitted to telecommunication device 204 and/or being associated with the first smart card 206 in, for example, the subscriber database 220. The MSISDN#2.3 may be associated with records which allow, for example, a device containing smart card 206 to make 911 calls, to send data by the data transfer application 234 (discussed further below), or for other (typically) limited purposes.

To transition the user-state between the removals and insertions of the smart cards out of and into telecommunication device 204, a state machine may be used by the smart card transfer application 232 and/or the smart card update server 222 to record the then-present user-state, such that when the smart cards are removed and re-inserted, the smart card transfer application (and/or the data transfer application 234) starts at the appropriate state in the process (rather than, for example, restarting at the beginning or elsewhere in the process). The recorded then-present user-state may be recorded in a server, such as the smart card update server 222, and/or in memory accessible to the telecommunication device 204, including, for example, the smart cards 206 and 208. A similar state machine may be implemented with respect to FIG. 1.

As disclosed above, a data transfer application 234 may be resident on telecommunication device 204 which manages the migration from first smart card 206 to second smart card 208, including the transfer of data and other information residing on first smart card 206 to second smart card 208. As discussed above, the data transfer application 234 may have already packaged such data and information for transmission to telecommunication device 204 for update to second smart card 208. As discussed above, the data transfer application 234 may have already sent such data and information to a network-based data repository, such as cloud repository 226 and/or to internal memory accessible to the telecommunication device 204, other than that found in a smart card. In another embodiment, the data transfer application 234 may identify the received server confirmation message from smart card update server 222 as a trigger to package and transfer such data and information to telecommunication device 204 for update to second smart card 208. In another embodiment, such data and information may be loaded to second smart card 208 from memory residing in telecommunication device 204.

Figure 4:
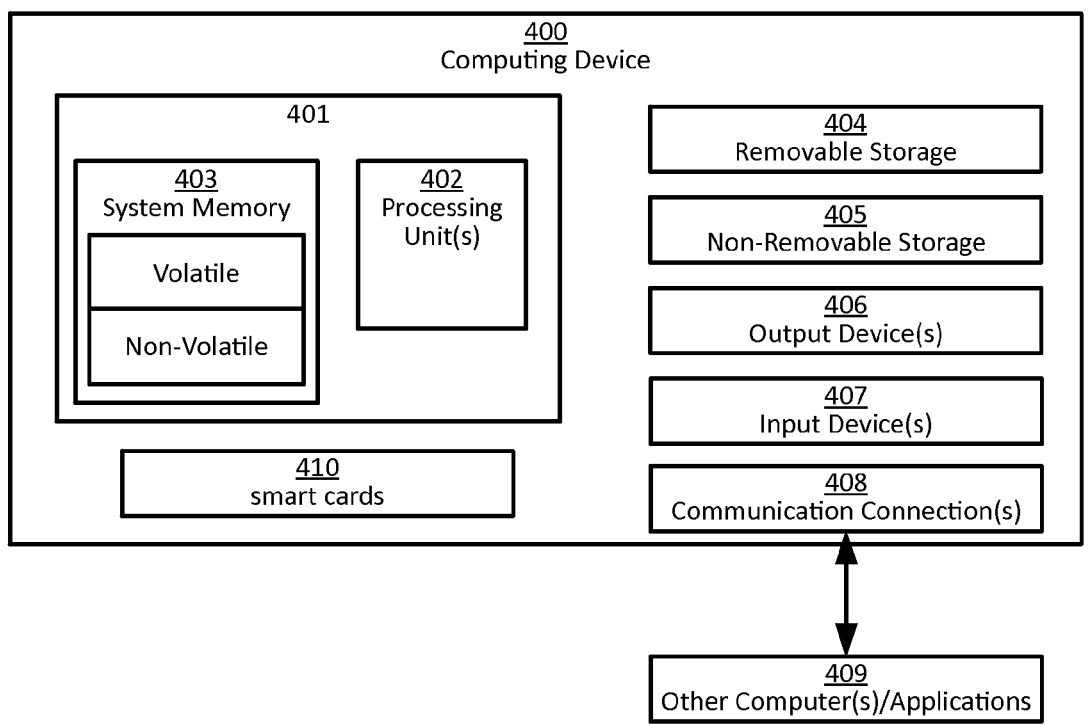
FIG. 4 is a functional block diagram of exemplary computing devices and some data structures and/or components thereof.

FIG. 4 is a functional block diagram of an exemplary computing device 400 that may be used to implement one or more computers described above. The computing device 400, in one basic configuration, comprises at least a processor 402 and memory 403. Depending on the exact configuration and type of computing device, memory 403 may be volatile (such as RAM), non-volatile (such as ROM, flash memory, etc.) or some combination of the two. Processing units and system memory may be combined, such as in a memory-resistor unit.

Computing device 400 includes one or more communication connections 408 that allow computing device 400 to communicate with one or more computers and/or applications 409. Device 400 may also have input device(s) 407 such as a keyboard, mouse, digitizer or other touch-input device, voice input device, etc. Output device(s) 406 such as a monitor, speakers, printer, PDA, mobile phone, and other types of digital display devices may also be included.

Additionally, device 400 may also have other features and functionality. For example, device 400 may also include additional storage (removable 404 and/or non-removable 405) including, but not limited to, solid-state media, magnetic or optical disks or tape. Additionally, device 400 may comprise smart cards 410, which may provide storage and/or processing units, as discussed above. Computer storage media includes volatile and nonvolatile, removable and non-removable media implemented in any method or technology for storage of information such as computer readable instructions, data structures, program modules or other data. Memory 403, removable storage 404, non-removable storage 405, and smart cards 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The invention claimed is:

1. A method comprising:
    transmitting, by a computing device, a first subscriber identifier of a first smart card of the computing device to a core wireless network;
    requesting, by the computing device, that a user of the computing device input an active mobile subscriber integrated services digital network-number (MSISDN) into the computing device, which active MSISDN is not bound to the first subscriber identifier by a home subscriber database of the core wireless network at a time when the computing device performs the requesting that the user input the active MSISDN;
    receiving, by the computing device, the active MSISDN input into the computing device by the user;
    transmitting, by the computing device, the active MSISDN to a smart card update server;
    requesting, by the computing device, that the user input a security code;
    receiving, by the computing device, the security code input by the user;
    transmitting, by the computing device, the security code input by the user to the smart card update server;
    using, by the computing device, the first subscriber identifier to register with a wireless network that include the core wireless network; and
    receiving, by the computing device, communications in the wireless network when the active MSISDN is used to route communications in the wireless network.

2. The method according to claim 1, wherein the security code input by the user was obtained by the user from the smart card update server via a second computing device differing by at least one component from the computing device and comprising a second smart card, which second smart card includes a second subscriber identifier, which second subscriber identifier is bound to the active MSISDN in the home subscriber database at a time when the user obtained the security code via the second computing device.

3. The method according to claim 2, wherein the computing device and second computing device share a common substrate computing device and are distinguished by their respective associations with the first smart card and the second smart card, with the common substrate computing device acting as the computing device when the first smart card is inserted into the common substrate computing device and acting as the second computing device when the second smart card is inserted into the common substrate computing device.

4. The method according to claim 1, wherein using the first subscriber identifier to register with the wireless network succeeds because the first subscriber identifier has been bound to the active MSISDN in the home subscriber database following the transmitting of the security code.

5. The method according to claim 1, further comprising, at a second computing device, obtaining data from a second smart card or from the second computing device, packaging the obtained data for transmission, and transmitting the packaged data.

6. The method according to claim 5, wherein the packaged data is transmitted to at least one of the computing device, the update server, or a network-based data repository.

7. The method according to claim 6, wherein the packaged data is transmitted to the network-based data repository before being transmitted from the network-based data repository to the computing device.

8. The method according to claim 5, wherein the packaged data is transmitted after receiving a message from the smart card update server.

9. The method according to claim 5, wherein the packaged data comprises at least one of entries in an address book, a digital photograph, or an email.

10. The method according to claim 1, further comprising receiving packaged data from at least one of a second computing device or a network-based data repository, unpacking the packaged data, and storing at least a portion of the packaged data on at least one of the first smart card or the computing device.

11. The method according to claim 1, further comprising receiving the security code from the smart card update server at a second computing device and providing the security code to the user through a user interface at the second computing device.

12. The method according to claim 1, wherein the first subscriber identifier is an international mobile subscriber identity (IMSI).

13. The method according to claim 1, further comprising:
obtaining or generating user-state data,
storing the user-state data locally or transmitting the user-state data to the update server, and
using the user-state data to transition a user interface which enables at least one of the requesting that the user input the active MSISDN, the receiving the active MSISDN, the requesting that the user input the security code, or the receiving the security code.

14. A method comprising: receiving, by a smart card update server associated with a core wireless network, an active mobile subscriber integrated services digital-number (MSISDN) and a first subscriber identifier from a first computing device, the active MSISDN not being bound to the first subscriber identifier by a home subscriber database of the core wireless network at a time when the smart card update server receives the active MSISDN; generating a security code; transmitting, by the smart card update server, the security code in a message to a second computing device, a second subscriber identifier of a second smart card of the second computing device being bound to the active MSISDN by the home subscriber database; receiving, by the smart card update server, the security code from the first computing device; unbinding in the home subscriber database, by the smart card update server, the active MSISDN from the second subscriber identifier; and binding, by the smart card update server, the first subscriber identifier with the active MSISDN.

15. The method according to claim 14, further comprising authenticating that the received security code from the first computing device is the security code transmitted to the second computing device.

16. The method according to claim 14, wherein either or both of the first subscriber identifier or the second subscriber identifier is an IMSI.

17. The method according to claim 14, further comprising transmitting a message to the second computing device requesting that the second computing device transmit packaged data from the second computing device to at least one of the first computing device, the smart card update server, or a network-based data repository.

18. The method according to claim 14, wherein the first and second computing devices share a common substrate computing device and are distinguished from each other by respective associations with the first smart card and the second smart card.

19. The method according to claim 14, further comprising obtaining or generating user-state data and transmitting the user-state data or a product of the user-state data to at least one of the first or the second computing device to transition a user interface in the first or the second computing device.

* * * * *